Aug. 11, 1964 J. A. NESMITH 3,143,954
AUTOMATIC COFFEE BREWING DEVICE
Filed Sept. 5, 1961 4 Sheets-Sheet 2

INVENTOR.
JAMES A. NESMITH
BY
HERBERT C. SCHULZE
ATTORNEY

Aug. 11, 1964

J. A. NESMITH 3,143,954

AUTOMATIC COFFEE BREWING DEVICE

Filed Sept. 5, 1961

INVENTOR.
JAMES A. NESMITH
BY
HERBERT C. SCHULZE
ATTORNEY

Aug. 11, 1964     J. A. NESMITH     3,143,954
AUTOMATIC COFFEE BREWING DEVICE
Filed Sept. 5, 1961     4 Sheets-Sheet 4
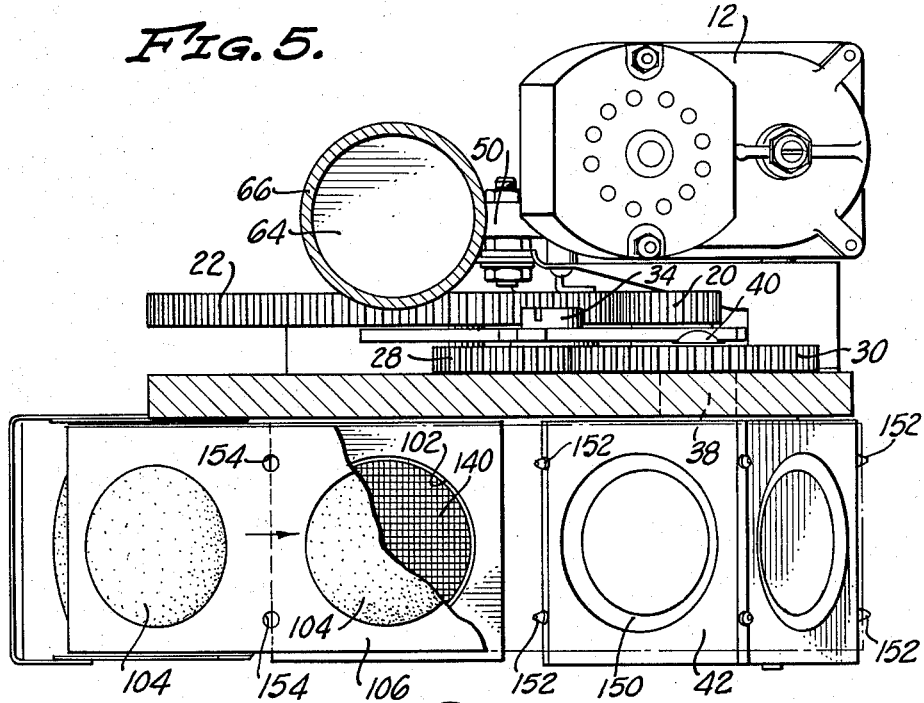
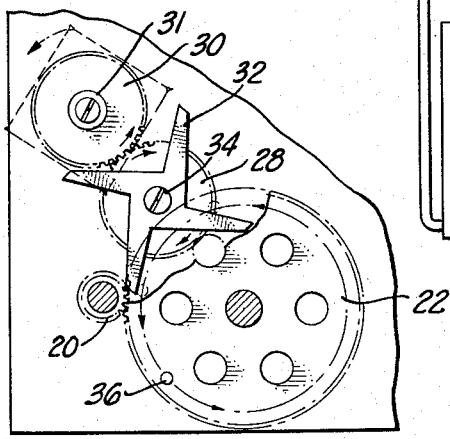
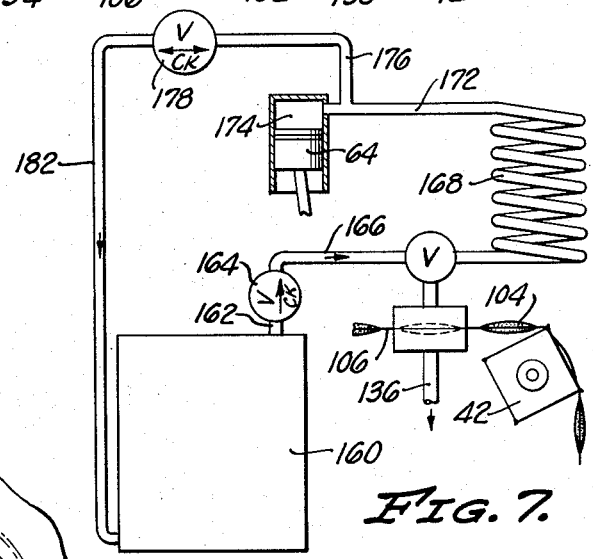
INVENTOR.
JAMES A. NESMITH
BY
HERBERT C. SCHULZE
ATTORNEY

United States Patent Office 3,143,954
Patented Aug. 11, 1964

3,143,954
AUTOMATIC COFFEE BREWING DEVICE
James A. Nesmith, Riverside, Calif.
(1926 E. La Veta Ave., Orange, Calif.)
Filed Sept. 5, 1961, Ser. No. 135,946
6 Claims. (Cl. 99—289)

This invention relates generally to automatic brewing devices of the filter tape type and particularly to a brewing plate that advances into and out of operative engagement with a hot water injector valve in such manner that the tape may be freely advanced by a special plural sided rotatable tape advancing member.

One of the main objects of the invention is to provide a simplified automatic coffee brewing and filter tape advancing mechanism.

Automatic coffee brewing devices of the filter tape type are well known in the art. It is entirely conventional to synchronize the movement of a filter tape to a brewing device. However, such well known machines have been complicated in design and it has been difficult to service and clean said prior brewing devices. It is a fundamental theory of the present invention to advance and withdraw a brewing plate into and out of engagement with a hot water injector valve and also to provide an immediately adjacent rotable type tape supporting and advancing mechanism. A synchronized plural sided advancing member draws the filter tape to brewing position between an overhead hot water injector valve and an upwardly and downwardly moving brewing plate.

A preferred embodiment of the invention has been disclosed without reference to the coin actuated and other conventional structure. The present invention is directed solely to a simplified coffee brewing device and tape advancing means using a conventional hot water system. A schematic and rather general disclosure of the hot water system is shown in the drawings to insure complete understanding of the operation of the device. However, any well known type of hot water system could be used in connection with the tape advancing member and special brewing plate and injector valve.

Another object of the invention is to provide an automatic coffee brewing device in which the brewing plate moves upwardly against the hot water injector valve.

Still another object of the invention is in the provision of a cam actuated brewing plate movable into and out of engagement with the hot water controlled injector valve.

Yet another object of the invention is to provide a plural sided tape advancing means that draws the filter coffee tape freely between a cam actuated brewing plate and a hot water injector valve.

A further object of the invention lies in a synchronized plural sided tape supporting member operating in timed relationship with an upwardly and downwardly moving brewing plate and overhead hot water injector valve.

The foregoing and other objects and advantages of the present invention will become apparent to those skilled in the art upon consideration of the following detailed description of the preferred embodiment thereof, reference being had to the accompanying drawings, herein:

FIGURE 5 is a sectional view taken on the line 5—5 of FIGURE 1;

FIGURE 6 is a partial schematic view of the gear and star wheel mechanism; and

FIGURE 7 is a schematic view of the hot water circulating and check valve system.

Figure 2:
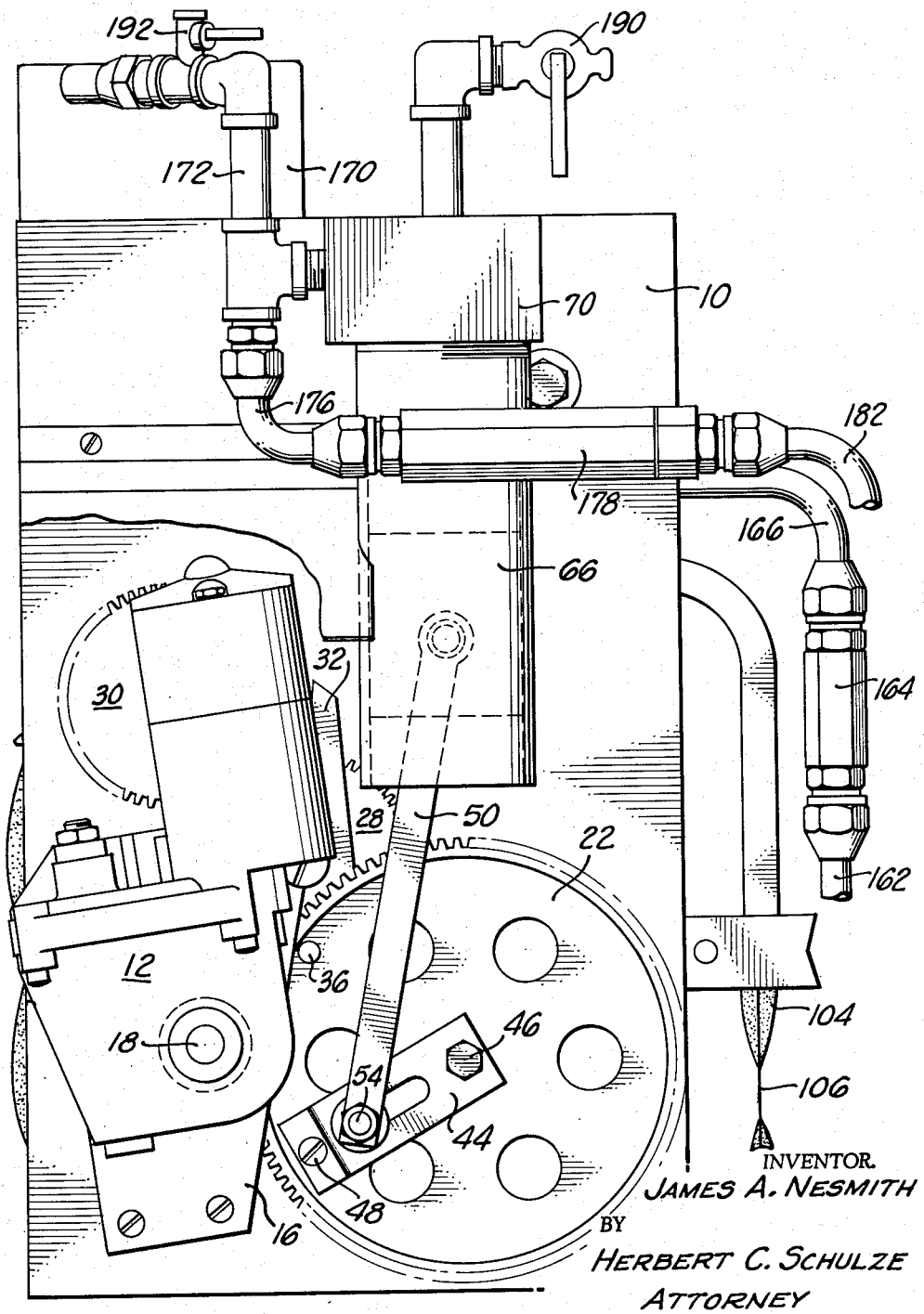
FIGURE 2 is a rear elevation view.

Referring to the drawings, a vertical panel 10 supports the operating elements of the machine. An electric motor 12 of known design is attached to a bracket 16 secured to the panel 10. A motor shaft 18 FIGURE 2 has a pinion gear 20 FIGURE 5 meshing with a gear wheel 22. The gear wheel 22 is keyed to a stub shaft 24 that is rotatably mounted in the panel 10 and a bearing 26. An intermediate gear wheel 28 FIGURE 6 is pivotally mounted at 29 on the rear side of the panel 10. A third gear wheel 30 is also pivotally mounted at 31 FIGURE 6 on the rear side of the panel 10. The above described gears are arranged as clearly shown in FIGURE 6. The gear 22 moves in the direction of the arrows. The gear 28 has its movement reversed in the direction of the arrows shown thereon. The third gear wheel 30 moves in a counter clockwise manner as also shown by the arrows. A star wheel 32 keyed at 34 to the intermediate gear 28 is actuated by a pin 36 on the gear wheel 22. The pin 36 engages the star wheel 32 as shown in FIGURE 6 and a clockwise movement is given to the intermediate gear 28. The gear 28 meshes with the third gear wheel 30 and transmits controlled and synchronized counter clockwise movement thereto.

A shaft 38 secured at 40 to the third gear wheel 30 is pivotally supported in the panel 10 and projects there through in a manner to support a square coffee filter tape advancing member 42 on the front face of the panel 10. The tape advancing member 42 will be described in detail later. The gear wheel 22 has a slotted bracket 44 FIGURE 2 secured thereto at 46 and 48. A pitman 50 is pitvotally connected at 52 to a stub shaft 54 adjustably bolted at 56 in the slotted bracket 44. The pitman 50 is pivoted on a wrist pin 58 secured in bearings 60 and 62 in a piston 64 contained within a cylinder 66. The cylinder 66 is threadedly connected at 68 in a cylinder head 70 bolted at 72 to the rear surface of the panel 10. The cylinder 66 is connected to the hot water system in a manner to be described later.

Figure 1:
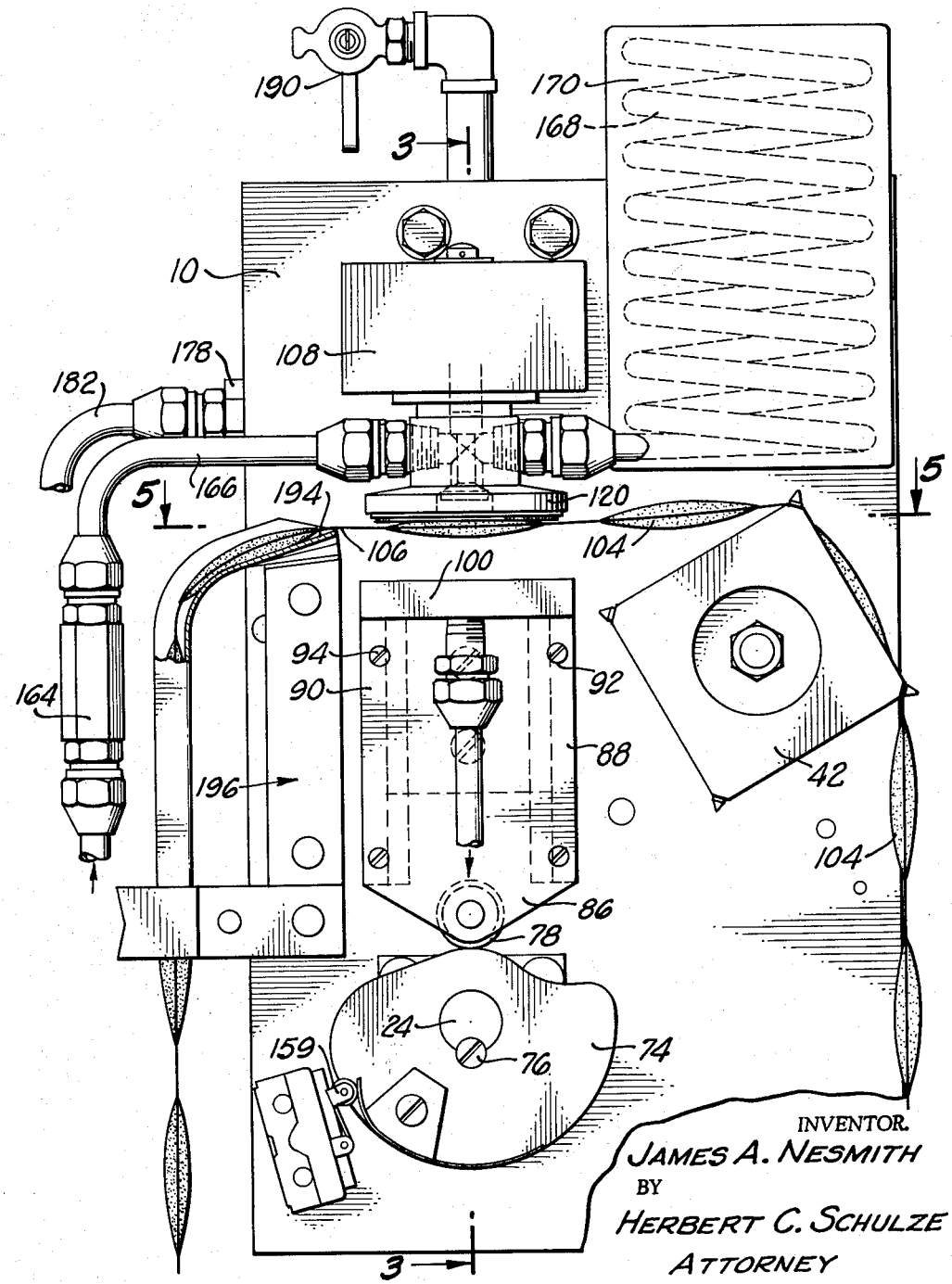
FIGURE 1 is a front elevational view partially schematic of a preferred embodiment of the invention.
Figures 3, 4:
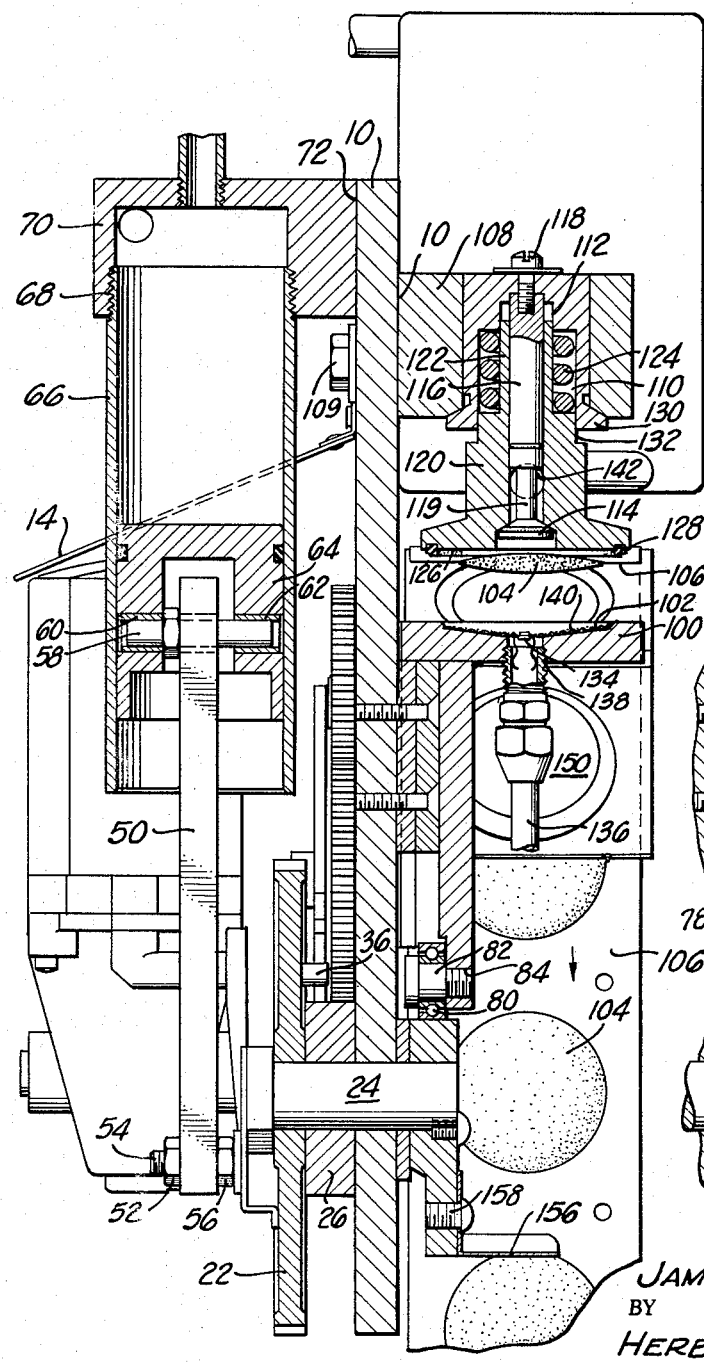
FIGURE 3 is a sectional view taken on the line 3—3 of FIGURE 1.
FIGURE 4 is a sectional view of the injector valve of FIGURE 3 in open position.

The motor and star wheel actuated gears rotate the stub shaft on gear 22 and also the shaft upon which the tape advancing member 42 is attached. The synchronized movement of the gears and shafts with the coffee brewing mechanism will be discussed later. The stub shaft 24 has a cam 74 keyed thereto at 76 on the front face of the panel 10. The cam 74 as shown in FIGURES 1, 3 and 4 engages a cam roller 78 having a bearing support 80 on a pin 82 threaded at 84 in the lower end of a vertically disposed plate 86. The plate 86 is slideably supported in guides 88 and 90. The guides 88 and 90 are bolted at 92 and 94 respectively, to the front face of the panel 10.

The vertical plate 86 has integrally formed therewith or welded thereto a horizontally disposed brewing plate 100. The plate 100 has a gradually recessed circular indentation 102 on the upper surface thereof. The indentation 102 conforms to the lower surface of one of the spaced filtered coffee packets 104 on a conventional tape 106. Immediately above the brewing plate 100 is a hot water injector valve mechanism comprising the following parts: a valve support 108 is bolted to the front upper face of the panel 10. The support 108 has a large interior bore 110 and a smaller bore 112. A hot water injector valve 114 has a vertical shaft 116 solidly connected by a screw and washer 118 in the support 108. The slightly narowed valve stem 119 and shaft 116 are surrounded by an enlarged housing 120 having a smaller upper end 122. A coil spring 124 encircles the smaller valve housing 122 and is sustained in the large interior bore 110. The lower end of the valve housing 120 has a circular groove formed therein concentric with the valve 114, and seated within this groove is an O-ring 128 of synthetic rubber, which protrudes slightly below the bottom surface of the housing to define a shallow circular recess 126, that receives the top edge of the coffee packet 104 in the tape 106. The injector valve mechanism may be made as a part of the support 108 or it may be a separate unit attached thereto with a lower outwardly extending bottom flange 130. The housing 120 is reduced at 132 to fit and slide slightly upwardly within the bore 110 as shown in FIGURE 4.

The brewing plate 100 is apertured centrally at 134 in order to communicate with a coffee pipe 136 threadedly connected thereto at 138. A reticulated strainer 140 covers the brewing plate recess 134 and the pipe 136 is conventional in that it leads directly to a paper coffee cup automatically disposed therebelow, but not shown. A hot water valve opening 142 is shown in communication with the valve 114 and narrowed stem 119 in FIGURES 3 and 4. The valve is shown in closed position in FIGURE 3 and is in open position in FIGURE 4. The cam actuated movement of the brewing plate toward and away from the hot water injector valve is best shown in FIGURES 3 and 4 of the drawings. The brewing plate 100 when energized in sequence with other parts moves upwardly against the filter tape 106 and first seals the coffee container portion 104 of the tape against the valve housing 120. Further slight upward movement of the brewing plate elevates the valve housing 120 to open the hot water inlet 142 and permit downward flow of hot water under pressure about the injector valve 114 through the coffee filled tape and thence through the strained aperture 134 to the cup filling pipe 136.

The filter tape advancing member 42 has been shown in rotatable square or other plural sided form. Each side of the tape advancer 42 is recessed in a circular manner at 150 to conform to the strained grains of the tape 106. Spaced spikes 152 on each corner of the tape advancer are adapted to coincide with similarly spaced apertures 154 on the tape 106. Progressive movement of the tape 106 is accomplished by the spiked plural sided advancer 42 and also by the tape supporting effect of the recesses 150 in which the coffee grains are embedded. The rotatable plural sided tape advancing member can only be moved when the brewing plate has been withdrawn from the hot water injector valve mechanism. The before described star wheel 32 and pin 36 control the intermittent movement of the third gear 30 and thus the actuation of the tape advancer 42. The movement of the gear 22 and cam actuated brewing plate 100 is also synchronized in sequence with the advancer 42 so that the filter tape is properly moved to bring a fresh coffee container below the injector valve as the brewing plate is moved to lowered position by cam action. The cam 74 has a single simple actuator finger 156 secured thereto at 158 and projecting therefrom in a manner to actuate a cut off switch 159 and stop machine operation until further energized automatically by coin deposit in the conventional manner.

A schematic showing or a preferred but still conventional hot water system essential to the operation of the machine is shown in FIGURE 7. A water tank 160 may be continuously heated by any well known method. Connective hot water circulation is initiated through a pipe 162 and a single standard check valve 164. A pipe 166 circulates the rising hot water through the injector valve mechanism generally shown as V in FIGURE 7 and heretofore described in detail. Until automatic machine operation, the hot water passes to a hot water coil 168 that is entirely encased and insulated at 170. The coil 168 at an elevated position maintains the water at proper useful temperature. The hot water communicates through a pipe 172 with the interior 174 of the cylinder 66 and also by a pipe 176 with a check valve 178 therein. The check valve 178 is a two-way check valve, which permits the water to flow at slow, constant velocity due to convection, from right to left, as seen in FIGURE 7. However, any sudden surge of the water in either direction, as when the piston 64 suddenly moves downwardly and then upwardly within the cylinder 174, causes the check valve 178 to close in the direction of the surge. A final pipe 182 permits the now cooling water to return to the main supply tank 160. The injector valve mechanism, check valves and hot water flow is instantly actuated when synchronized sequential operation of the machine demands upward movement of the piston 64 in the cylinder 66 and pressurized expulsion of a cup of hot water therefrom and through the system. The hot water now under pressure closes the check valves 164 and 178, respectively. The timed operation of the machine has now raised the brewing plate 100 upwardly against the valve housing 120 thus opening the hot water aperture 142 in the injector valve mechanism. Substantially a cup of hot water is ejected about the valve 114 and narrowed stem 117 and thence upon the filtered coffee container portions 104 sealed upon the apertured brewing plate. The coffee grains are completely strained and the fresh coffee mixture passes through the tube 136 to an automatically placed cup, not shown. Withdrawal of the brewing plate permits spring depression of the valve housing 120 about the valve 114, thereby closing the hot water opening 142. Downward synchronized and sequential movement of the piston 64 in the cylinder 66 at the same time relieves the water system of pressure, returns it to normal convective rising hot water flow through the now pressure relieved check valves 164 and 178.

Air relief valves are shown at 190 and 192. It is necessary to bleed air from the hot water system or cylinder 66 at various times.

It is believed that the operation of the machine is clear and that fundamentally, the particular movement of the brewing plate and injector valve mechanism is clear. It is emphasized that the star wheel controlled actuation of the advancing member 42 withdraws the tape from a guide 194 bracketed at 196 to the panel 10, in a direct line therewith so that the tape, relieved from the brewing and injector mechanism is free to move in an unimpeded manner. The strained coffee grains supported and embedded in the recesses 150 in the plural sided advancer 42 relieve the tape engage spikes 152 of considerable advancing pressure and thereby assist in maintaining the tape from expensive service because of breakage.

While I have shown and described in considerable detail what I believe to be the preferred form of my invention, it will be apparent to those skilled in the art that many changes may be made in the shape and arrangement of the several parts without departing from the broad scope of the invention, as defined in the following claims.

I claim:
1. A rapid brewing device, comprising:
   a tape;
   a plurality of filter packages each containing a dry beverage mixture supported by said tape in spaced apart relationship to each other;
   a hot water injector above said tape;
   a tape guide disposed below said injector and on one side thereof;
   a plural sided tape mover disposed below said injector and on the other side thereof, said tape being suspended between said guide and said tape mover, and advanced intermittently below said injector by said tape mover;
   a brewing plate below said tape and injector;
   means for moving said brewing plate upwardly against said tape; and
   actuating means engageable by said brewing plate and pushed upwardly thereby as the brewing plate approaches the end of its upward travel, for actuating said injector to cause hot water to be injected through said beverage mixture and said brewing plate.

2. A device as set forth in claim 1 in which said brewing plate is actuated by a cam, and driving means connected to said cam and to said tape mover for driving the same in synchronism.

3. A device as set forth in claim 2 in which said plural sided tape mover is recessed to receive the packets.

4. A beverage making and dispensing apparatus comprising:
   a hot water injector valve;
   a tape;
   a plurality of filter packages each containing a dry beverage mixture supported by said tape in spaced apart relation to one another;
   a tape guide disposed below said injector valve and on one side thereof;
   a beverage plate disposed below said tape and said injector valve;
   a tape mover disposed below said injector valve and on the other side thereof, said tape being suspended between said guide and said tape mover, and advanced intermittently below said injector valve by said tape mover; and
   means for moving said beverage plate upwardly against said tape; and
   actuating means engageable by said beverage plate and pushed upwardly thereby as the beverage plate approaches the end of its upward travel, for actuating said injector valve to cause hot water to be injected through said beverage mixture and said beverage plate.

5. A device as set forth in claim 1 in which said tape mover comprises a rotating head having a plurality of angularly related flat sides, each of which is recessed to receive one of the packets on said tape, and means for indexing said head so as to bring a fresh packet into position between said valve and said plate.

6. A rapid coffee brewing device of the continuous filter tape type, comprising:
   a hot water injector valve;
   means for intermittently advancing a filter tape beneath said valve to sequential brewing positions, including a plural sided and recessed tape mover adapted to support and advance said tape, said tape mover having tape-engaging spikes thereon;
   a brewing plate disposed below said tape, and movable vertically with respect thereto between a first position spaced downwardly from said tape and a second position pressing upwardly against the bottom surface of the tape;
   means movable upwardly by said brewing plate as the latter approaches said second position for opening said valve, thereby causing hot water to be injected through said tape and said brewing plate;
   cam means moving said brewing plate between said first and second positions; and
   means for driving said cam means and said tape mover in synchronism with respect to one another.

References Cited in the file of this patent
UNITED STATES PATENTS
2,939,380   Parraga _____ June 7, 1960

FOREIGN PATENTS
258,139     Italy _____ Apr. 6, 1928
808,538     Great Britain _____ Feb. 4, 1959
871,324     Great Britain _____ June 28, 1961
1,238,694   France _____ July 4, 1960